United States Patent [19]

Borzio

[11] Patent Number: 5,762,686
[45] Date of Patent: Jun. 9, 1998

[54] PROCESS FOR DETERMINING AMOUNT OF ARGON CONTAMINATION IN OXYGEN AND RELATED APPARATUS THEREFOR

[75] Inventor: Raymond A. Borzio, Durham, N.C.

[73] Assignee: Special Gas System, Inc., Durham, N.C.

[21] Appl. No.: 708,407

[22] Filed: Sep. 4, 1996

[51] Int. Cl.$^6$ .............................. B01D 15/08; B01D 53/47
[52] U.S. Cl. .............................. 95/82; 95/96; 95/138; 96/101; 96/108
[58] Field of Search ............................. 95/82, 96, 97, 95/104, 138; 96/101, 108, 121, 130, 133, 144

[56] References Cited

U.S. PATENT DOCUMENTS

| | | | |
|---|---|---|---|
| 4,421,531 | 12/1983 | Dalton, Jr. et al. | 55/26 |
| 4,477,265 | 10/1984 | Kumar et al. | 95/138 X |
| 4,529,412 | 7/1985 | Hayashi et al. | 55/25 |
| 4,566,881 | 1/1986 | Richter et al. | 95/138 X |
| 4,661,125 | 4/1987 | Haruna et al. | 55/26 |
| 4,781,735 | 11/1988 | Tagawa et al. | 55/26 |
| 4,813,979 | 3/1989 | Miller et al. | 95/96 |
| 4,869,733 | 9/1989 | Stanford | 55/21 |
| 4,880,443 | 11/1989 | Miller et al. | 96/130 X |
| 5,220,797 | 6/1993 | Krishnamurthy et al. | 62/22 |
| 5,226,933 | 7/1993 | Knaebel et al. | 55/26 |
| 5,302,187 | 4/1994 | Itoh et al. | 95/11 |
| 5,360,467 | 11/1994 | Ketkar et al. | 95/138 X |
| 5,391,358 | 2/1995 | Heim | 96/121 X |

OTHER PUBLICATIONS

Technical Information Bulletin (1994) from Whatman Inc. entitled "Installation, Operation and Maintenance Whatman® 76-92 and 76-94 Ultra Pure Nitrogen Generators", pp. 1-2.

Primary Examiner—Robert Spitzer
Attorney, Agent, or Firm—Jenkins & Wilson, P.A.

[57] ABSTRACT

A process for determining the amount of argon contamination present in high purity oxygen employing a combination apparatus including a gas chromatography apparatus, a pressure swing adsorption apparatus, and a conduit connecting the two apparatus to each other. The gas chromatography apparatus can be run with its column at about 70° F. (21.1° C.) or higher. A sample of the high purity oxygen is fed to the pressure swing adsorption apparatus, where a portion of the oxygen is removed, and then the thus modified sample is fed through the conduit to the gas chromatography apparatus. Since some of the oxygen has been removed with the pressure swing adsorption apparatus, the graph generated by the gas chromatography apparatus shows 2 resolved peaks, namely a small argon peak preceding a large oxygen peak, even though the column of the gas chromatography apparatus is not being cooled to cryogenic temperatures with a cryogen. Also, instead of first subjecting the high purity oxygen to the pressure swing apparatus, a sample is fed directly to the gas chromatography apparatus, which produces a graph that has only 1 large peak due to the oxygen which masks the small argon peak. By comparing the 2 graphs, an accurate determination can be made of the amount of argon contamination in the high purity oxygen.

14 Claims, 4 Drawing Sheets

PROCESS FOR DETERMINING AMOUNT OF ARGON CONTAMINATION IN OXYGEN AND RELATED APPARATUS THEREFOR

TECHNICAL FIELD

The present invention relates, in general, to a process for determining, with a gas chromatography apparatus, the amount of argon contamination present in oxygen. More particularly, the present invention relates to a process for determining, with a gas chromatography apparatus that has been modified by connection to a pressure swing absorption apparatus, the amount of argon contamination present in oxygen, especially high purity oxygen having an extremely low level of argon contamination, for instance, 30 parts per million volume or lower, wherein the process does not necessitate cooling, below ambient temperatures, the column inside the gas chromatography apparatus.

BACKGROUND OF THE INVENTION

Air comprises about 80% nitrogen and about 20% oxygen, with minor amounts of various other gases, such as argon, carbon dioxide, hydrocarbons, and the like. Various processes, such as a cryogenic air separation process, a pressure swing absorption process, et cetera, are well known for separating these various gas components in air so that the respective components may be individually marketed.

More specifically, in connection with the pressure swing absorption process, a pressure swing adsorption apparatus has at least one adsorption tower (also known as a column) which contains a bed of an adsorbent material that is selective toward one of the gases that is going to be separated. In a typical operation of a pressure swing absorption apparatus, generally 4 steps are followed.

First, a feed gas such as air (which is to be separated into its various component gases) is delivered under pressure to a previously pressurized tower at a feed end of the tower. During this step, the gas to be separated (the secondary product or "heavy" gas) is adsorbed onto the selective adsorbent material, and the remaining gas (the primary product or "light" gas) escapes through the product end of the tower. More particularly, as the feed passes through the tower, the more strongly adsorbed component (the "heavy" component) is selectively taken up by the absorbent material in the tower. At the other end of the tower, a continuous stream of purified, less strongly adsorbed component is taken off.

As the bed of adsorbent material reaches its capacity, the product stream is closed off, and the second step, the blow down step, takes place when the tower is vented to decrease the pressure. The result is that the previously adsorbed secondary product gas is de-sorbed from the adsorbent material and readily escapes from the tower into a lower pressure area.

Third, the tower is subjected to a purge step in which the primary product gas is recycled through the tower in a direction countercurrent to the feed step in order to remove any of the adsorbed product gas still remaining in the tower and to regenerate the bed of adsorbent material. The purge step stops when the purge stream reaches the product end of the tower, at which point a valve at the feed end is closed to commence the pressurization step.

During the fourth or pressurization step, purified primary product gas continues to flow into the tower through the product end of the tower while the feed end is closed, which results in the tower being pressurized by the primary product gas. This completes a pressure swing adsorption cycle. The next cycle begins with repetition of the first feed step described above, followed by repetition of the second, third, and fourth steps.

Of interest with respect to pressure swing adsorption processes and the related apparatus for these processes are U.S. Pat. No. 4,421,531 to Dalton et al.; U.S. Pat. No. 4,529,412 to Hayashi et al.; U.S. Pat. No. 4,781,735 to Tagawa et al.; U.S. Pat. No. 4,869,733 to Stanford; U.S. Pat. No. 5,220,797 to Krishnamurthy et al.; and U.S. Pat. No. 5,302,187 to Itoh et al.

Examples of pressure swing adsorption processes and the related apparatus for these processes, specifically in connection with the separation of oxygen from a gas mixture, such as air, in order to produce high purity oxygen, can be seen in U.S. Pat. No. 4,661,125 to Haruna et al. and U.S. Pat. No. 5,226,933 to Knaebel et al.

The disclosures of all of the above-mentioned patents are incorporated herein by reference.

Once the desired gas, such as oxygen, is obtained from the gas mixture, the desired gas is assayed to determine the amount of other gases still present as contaminants so that the desired gas may be marketed as having a certain level of purity.

Particularly with respect to oxygen, in recent years there has been a need for ever increasing minimum assayed purity levels (typically 99.999% minimum purity oxygen, which is a contamination level, for all contaminant gases present, of 10 parts per 1,000,000 volume or less) in order to provide high purity oxygen, for instance, for use in semi-conductor manufacturing processes.

The following is a list (where parts per million volume is abbreviated as PPMV) of the typical amounts of the generally occurring contaminant gases present in commercially available high purity oxygen that is delivered to customer storage sites either in large bulk quantities in cylinders as cryogenic liquids, or in small quantities in cylinders as high pressure, compressed gas.

Contamination Amounts of Various Gases Present in High Purity Oxygen

| | |
|---|---|
| argon | <5 PPMV |
| nitrogen | <2 PPMV |
| krypton | <1 PPMV |
| carbon monoxide/carbon dioxide | <0.5 PPMV |
| total hydrocarbons | <0.5 PPMV |
| water vapor | <1 PPMV |

Due to the relatively reactive nature of carbon monoxide, carbon dioxide, hydrocarbons, and water vapor, detection of the amount of contamination by each of these in oxygen is accomplished through various ionization and/or electrochemical means performed on a sample of oxygen.

On the other hand, because argon, nitrogen, and krypton are very non-reactive, the various ionization and/or electrochemical means cannot be employed for detection of the amount of contamination by each of these in oxygen. Thus, detection of the amount of contamination by each of these in oxygen has been generally related to their mass or their ability to conduct heat. More particularly, the physical property of the ability to conduct heat has made detection by way of thermal conductivity the most widely accepted means of detection of the amount of these contaminants in oxygen.

Typically, the thermal conductivity means is a gas chromatography apparatus that employs a molecular sieve column and employs helium as a reference gas. The gas chromatography apparatus has an associated means for generating a graph with peaks representing the respective contaminant components of the sample of oxygen fed to the apparatus. In older apparatus, the means for generating a graph typically is a stylus together with paper, whereas in newer apparatus, the means for generating a graph typically is a video screen and/or a laser printer together with paper. It is noted that in addition to detection of contaminants, oxygen will be detected and shown as a peak on the graph when using helium as the reference gas.

However, argon and oxygen have similar physical properties as follows.

Physical Constants of Gas Molecules

| Physical properties | Argon | Oxygen |
| --- | --- | --- |
| Density (g/liter) | 1.7834 | 1.4289 |
| Specific gravity (air = 1) | 1.38 | 1.1053 |
| Melting point (°C.) | −189.2 | −218.4 |
| Boiling point (°C.) | −185.7 | −182.9 |
| Molecule diameter | | |
| Length (Å) | 3.84 | 3.9 |
| Width (Å) | — | 2.8 |
| Van der Waals constants | | |
| a ($10^6 cm^6 mol^{-2}$) | 1.35 | 1.36 |
| b ($cm^3 mol^{-1}$) | 32.3 | 31.9 |
| Critical constants | | |
| $t^c$(°C.) | −122.4 | −118.5 |
| $p_c$(atm) | 48.1 | 49.7 |
| $D_c$(g · $cm^{-3}$) | 0.533 | 0.436 |

Therefore, when argon is present as a contaminant, then, due to the similar physical properties, argon and oxygen exhibit very similar retention times in a gas chromatography apparatus that uses a molecular sieve column for separation of these components in the analyte (i.e., the sample of oxygen fed to the gas chromatography apparatus).

Consequently, when the reference gas employed is research grade helium (minimum assayed purity of 99.9999% or better), although commercially available gas chromatography apparatus are amply sensitive to detect the amount of argon contamination in a sample of oxygen to the level necessary, if the amount of argon contamination is very small (i.e., the oxygen is very high purity oxygen, such as that with about ≦30 PPMV argon, more particularly, such as that with about ≦15 PPMV argon, more particularly, such as that with about ≦10 PPMV argon, and even more particularly, such as that with about ≦5 PPMV argon), the resultant response to oxygen (i.e., the oxygen peak on the graph generated by the gas chromatography apparatus) will be so great that the relatively small response to the argon contaminant of interest will be a small argon peak unresolved from the large oxygen peak. As a result, the large oxygen peak completely disguises or masks the small argon peak, and hence, even though the gas chromatography apparatus has detected the amount of argon contamination, the argon peak cannot be seen on the graph.

Because use of the molecular sieve column and the helium reference gas in a gas chromatography apparatus is the most efficient means for this type of separation, a need arises to improve the separation performance of the column in order to create sufficient distance on the graph generated by the gas chromatography apparatus between the very small argon peak, which appears first, and the following large oxygen peak, particularly for when oxygen with a very low level of argon contamination is being sampled.

Further in connection with peak separation, it is noted that even high purity oxygen typically has a small amount of nitrogen and krypton contaminants. However, sufficient separation usually will be achieved between the large oxygen peak and the small nitrogen peak that elutes next from the column by using a low carrier gas flow to allow enough time for the gas chromatography apparatus to recover from the exposure to such a large amount of oxygen. Observing the small krypton peak is not a problem because the krypton peak follows the nitrogen peak.

However, creating the sufficient time for separating the argon peak from the oxygen peak appearing on the graph traditionally has been accomplished by using very low carrier gas flows coupled with very low column temperatures far below ambient temperatures (about 70° to 72° F., which is about 21.1° to 22.2° C.). Generally, the column temperatures range from about −303° F. (−186° C., the temperature that is the boiling point of liquid nitrogen) to about −130° F. (−90° C., the temperature above which the gas separation industry generally considers no longer to be a cryogenic temperature), in the gas chromatography apparatus. Such low temperatures are usually achieved by employing a cryogen, such as liquid nitrogen, around the column to cool it and further slow the gas flow, but the use of cryogens creates an obvious safety disadvantage for personnel having to handle them.

Unexpectedly, a more desirable approach contemplated by the present inventors for achieving separation of the argon and oxygen peaks appearing on the graph was to remove a portion of the oxygen from the sample stream. Since relatively less oxygen and more argon would be present in the sample stream, resolution of the argon and oxygen peaks on the graph and hence detection of the amount of argon contamination by the gas chromatography apparatus should be attainable at warmer, preferably above ambient, temperatures. However, the problem was how to remove a portion of the oxygen.

Traditional distillation techniques will not achieve the desired result of removing a portion of the oxygen from the sample stream because, as noted above, the boiling points of oxygen and argon are similar. Furthermore, removing a portion of the oxygen from the sample stream by way of one of the various permanent reactions available for oxygen removal is not commercially viable because the catalysts involved in these reactions are expensive and hence not cost effective for removing large amounts of oxygen from a sample containing a major amount of oxygen and a minor amount of argon. Rather, these catalysts are reserved for removing trace amounts of oxygen from a gas, such as nitrogen, in which oxygen is the contaminant that it is desired to remove.

SUMMARY AND OBJECTS OF THE INVENTION

Accordingly, the present invention provides a process for determining the amount of argon contamination present in a gas comprising a minor amount of argon as contamination and a major amount of oxygen so that the gas has a high oxygen to argon volume ratio.

The process comprises feeding a sample of the gas from a container of the gas to a pressure swing apparatus that has been adapted for selectively removing oxygen from air, and then, subjecting the gas sample to pressure swing adsorption in the apparatus in order to remove a portion of the oxygen from the gas sample. As a result, provided is a modified gas sample having a smaller oxygen to argon volume ratio than the gas sample originally had.

Next, the process comprises subsequently feeding the modified gas sample, after it leaves the pressure swing adsorption apparatus, to a gas chromatography apparatus that is adapted to generate gas chromatography graphs and that includes a column run at a temperature of at least about 70° F. (21.1° C.) in order to generate from the modified gas sample a gas chromatography graph having a large peak from the oxygen in the modified gas sample and a small peak from the argon in the modified gas sample, with the small argon peak preceding and being resolved from the large oxygen peak.

Then, comparing the gas chromatography graph obtained from the modified gas sample to another gas chromatography graph is performed. The other gas chromatography graph was obtained by subjecting another sample of the gas directly to the gas chromatography apparatus with the column run at a temperature of at least about 70° F. (21.1° C.), and free of first subjecting the other gas sample to pressure swing adsorption. The other gas chromatography graph has a large unitary peak that is predominantly from the oxygen in the other sample and that masks a small peak from the argon in the other sample. From comparing, obtained is a more accurate determination of the amount of argon contamination in the gas than can be obtained from subjecting the gas sample to a gas chromatography process free of first subjecting the gas sample to pressure swing adsorption.

The present invention also provides, in combination, a pressure swing adsorption apparatus, a gas chromatography apparatus, and a conduit connecting the pressure swing adsorption apparatus and the gas chromatography apparatus, the combination being an apparatus for determining how much argon contamination is present in substantially pure oxygen.

The pressure swing adsorption apparatus is adapted for selectively removing oxygen from air and is connected to a conduit for receiving a sample of gas from a container of the gas (wherein the gas comprises a minor amount of argon as contamination and a major amount of oxygen so that the gas has a high oxygen to argon volume ratio) in order to subject the gas sample to pressure swing adsorption inside the pressure swing adsorption apparatus and remove a portion of the oxygen from the gas sample and provide a modified gas sample having a smaller oxygen to argon volume ratio than the gas sample originally had. The gas chromatography apparatus has a column and is adapted to generate gas chromatography graphs of gas samples and is connected to a conduit for receiving another sample of the gas directly from the container. The conduit connecting the pressure swing adsorption apparatus and the gas chromatography apparatus is adapted to transfer the modified gas sample to the gas chromatography apparatus after the modified gas sample leaves the pressure swing adsorption apparatus.

The gas chromatography apparatus will, when the column is at a temperature of at least about 70° F. (21.1° C.), (a) generate from the other gas sample, a gas chromatography graph having a large unitary peak (i) being predominantly from the oxygen in the other gas sample and (ii) masking a peak from the argon in the other gas sample, and (b) generate from the modified gas sample, a gas chromatography graph having a large peak from the oxygen in the modified gas sample and a small peak from the argon in the modified gas sample with the argon peak preceding and being resolved from the oxygen peak. As a result, the two graphs can be compared to obtain, from the combination apparatus, a more accurate determination of the amount of argon contamination in the gas than can be obtained from a gas chromatography apparatus that tests the gas sample free of the gas sample first being modified through a pressure swing adsorption apparatus.

Therefore, it is an object of the present invention to obviate the prior art problems of lack of resolution of the small argon peak from the large oxygen peak when analyzing, with a gas chromatography apparatus, a sample of oxygen contaminated with argon, especially when the amount of argon contamination is extremely low, for instance about 30 PPMV or lower, more particularly about 15 PPMV or lower, more particularly about 10 PPMV or lower, and even more particularly about 5 PPMV or lower.

It is another object of the present invention that the inventive process and related inventive combination apparatus therefor can be employed with the column in the gas chromatography apparatus at ambient temperatures or higher, as a result of which there is no need for keeping the column cold by surrounding it with cryogenic gas.

Some of the objects of the invention having been stated above, other objects will become evident as the description proceeds, when taken in connection with the Examples and accompanying drawings as described below.

DETAILED DESCRIPTION OF THE INVENTION

Figure 1:
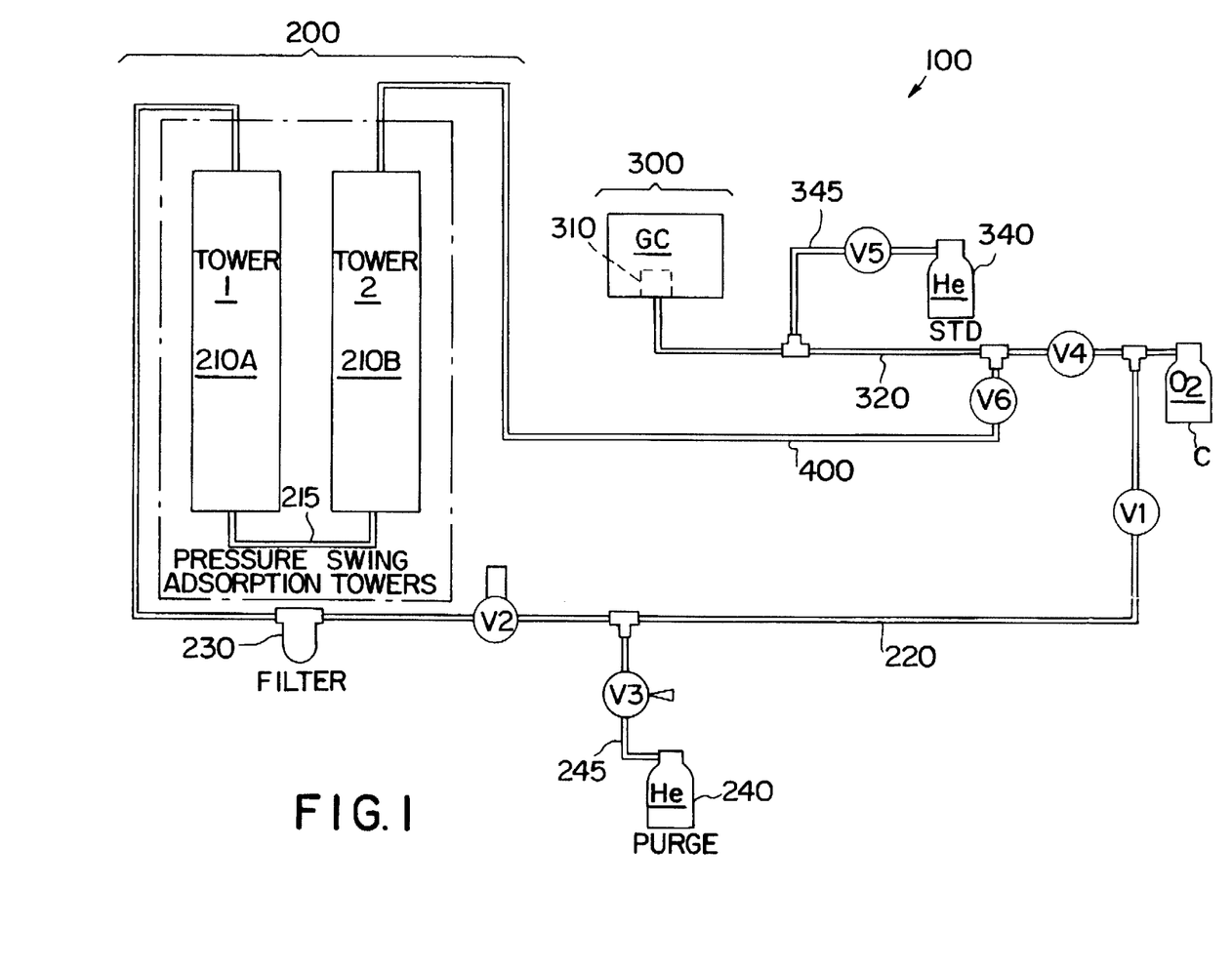
FIG. 1 is a schematic diagram of the inventive apparatus showing, in combination, a pressure swing apparatus and a gas chromatograph apparatus.

Depicted schematically in FIG. 1 is apparatus 100 for determining the amount of argon contamination in oxygen. Apparatus 100 comprises, in combination, pressure swing apparatus 200, gas chromatography apparatus 300, and conduit 400 connecting pressure swing apparatus 200 and gas chromatography apparatus 300 to each other. Typically, helium is used as the carrier gas.

Various pressure swing apparatus are commercially available, and the particular pressure swing apparatus 200 employed for performing tests, as indicated in the Examples below, was Item Serial No. 76-92-0001, commercially available from Whatman. Whatman markets this apparatus as an ultra-high purity nitrogen generator because in its intended use, air is fed under pressure to the apparatus, the 2 towers (which contain zeolite molecular sieves) inside the apparatus selectively adsorb oxygen from the air, and hence, nitrogen from the air is generated by the apparatus.

More specifically, pressure swing adsorption apparatus 200 includes first tower 210A and second tower 210B, connected to each other by pipe or tube 215. As is well known in the art of pressure swing adsorption apparatus, first tower 210A and second tower 210B each contain an adsorbent material (not shown), which may suitably be a zeolite molecular sieve, for selectively removing oxygen from air. It is noted that a pressure swing apparatus with two towers is not necessary to the invention, and hence, a pressure swing apparatus with one tower or more than two towers may be employed.

Furthermore, towers 210A, 210B are connected by way of first conduit 220 to container C, which contains gas that is substantially pure $O_2$, as denoted in FIG. 1. In other words, the gas comprises a minor contaminant amount of argon and a major amount of oxygen so that the gas has a high oxygen to argon volume ratio. Containers such as container C of substantially pure $O_2$ gas are commercially available, with the $O_2$ being obtained by various well-known processes such as that described in the above-mentioned U.S. Pat. No. 4,661,125 to Hayashi.

Apparatus 100 is particularly useful with substantially pure $O_2$ gas that contains as contamination of about $\leq 15$ PPMV argon, more preferably about $\leq 10$ PPMV argon, and most preferably about $\leq 5$ PPMV argon. As noted above, the substantially pure $O_2$ gas may also contain minor amounts of various other contaminant gases, such as nitrogen, hydrocarbons, carbon dioxide, carbon monoxide, krypton, and the like.

Also, pressure swing adsorption apparatus 200 includes filter 230, shown in FIG. 1 as associated with first conduit 220, for removing particulates that may be present in the air being fed to pressure swing adsorption apparatus 200. Since in the process of the present invention, air from the atmosphere, which contains particulates, is not being fed to pressure swing adsorption apparatus 200, but rather, as described in more detail in the Examples below, substantially pure oxygen is being fed, use of filter 230 is not necessary with the present invention.

As also shown in FIG. 1, pressure swing adsorption apparatus 200 may be connected to tank 240 of helium gas, useful as a purge, by way of pipe or tube 245, which in turn is connected to first conduit 220. First conduit 220 is provided with valves V1, V2 located on respective sides of the location where pipe 245 connects to first conduit 220, and pipe 245 is provided with valve V3, so that connection of pressure swing adsorption apparatus 200 to gas container C may be shut off by closing valve V1. Then, pressure swing apparatus 200 can be purged with helium from tank 240, as can be readily determined by the person of ordinary skill in the art. When tank 240 is not in use as a helium purge, then valve V3 is left shut.

Various gas chromatography apparatus are commercially available, and the particular gas chromatography apparatus 300 employed for performing tests, as indicated in the Examples below was Item Serial No. P200 portable gas chromatography apparatus, commercially available from MTI Analytical Instruments, and this is the apparatus 300 described as follows.

More specifically, inside of gas chromatography apparatus 300 is column 310, which suitably may be a molecular sieve column. Also, gas chromatography apparatus 300 is connected by way of second conduit 320 to gas container C. Second conduit 320 is provided with valve V4 in order to shut off, when desired, connection between gas chromatography apparatus 300 and gas container C, as can be readily determined by the person of ordinary skill in the art.

As is typical in the art of gas chromatography, gas chromatography apparatus 300 further includes reference tank 340 of gases, such as nitrogen, argon, and/or krypton, in a predominantly helium matrix, with the helium suitably having a minimum assayed purity of 99.9999% or better, which gases are used as a standard or reference. Apparatus 300 and reference tank 340 are connected to each other by way of pipe 345 that is provided with valve V5 in order to shut off, when desired, connection between gas chromatography apparatus 300 and reference tank 340.

In the process of the present invention, as described in more detail below, gas chromatography apparatus 300 may be run with column 310 running at ambient or higher temperatures of at least about 70° F. (about 21.1° C.), more particularly, from about 70° F. to about 122° F. (about 21.1° C. to about 50° C.), and more suitably about 95° F. to about 104° F. (about 35° C. to about 40° C.), as it is not necessary in the present invention to have means in gas chromatography apparatus 300 to cool the column by surrounding it with cryogenic gas as a coolant.

Not shown, means for generating a graph, such as paper and a stylus, or, in new types of gas chromatography apparatus, a video screen and/or paper together with a laser printer, are associated with gas chromatography apparatus 300 in order to generate a graph from a sample fed through gas chromatography apparatus 300.

In connection with generating a graph, it is very generally noted that, as is well-known in the art, a sample that is a mixture of 2 or more components is fed into a gas chromatography apparatus, which passes the sample into a column, typically a molecular sieve, inside of the apparatus where the sample is separated into its respective components because the components travel at different rates through the column. Then, the gas chromatography apparatus generates a graph based on time and illustrating respective peaks corresponding to the respective components as they pass out of the gas chromatography apparatus at different time intervals.

However, as mentioned above, if 2 components are physically similar, the time intervals will not be sufficiently different and the 2 peaks will overlap on the graph and not be resolved from each other.

As noted above, conduit 400 connects pressure swing apparatus 200 and gas chromatography apparatus 300 to each other. Conduit 400 is provided with valve V6, which may be shut, as described further below vis-a-vis the method, to prevent transfer of a gas sample from pressure swing apparatus 200 to gas chromatography apparatus 300.

In the method of use, for determining the amount of argon contamination in substantially pure oxygen, combination apparatus 100 is employed as follows. It is noted that when performing the inventive process, combination apparatus 100 can be employed with column 310 in gas chromatography apparatus 300 at ambient temperatures or higher, as a result of which there is no need to provide means for keeping the column cold by surrounding it with cryogenic gas as a coolant. Thus, the temperature should be at least about 70° F., more suitably, about 70° F. to about 122° F. (about 21.1° C. to about 50° C.), and even more suitably about 95° F. to about 104° F. (about 35° C. to about 40° C.).

Valve V3 is left shut, as it is only needed when helium purge from tank 240 is desired. Valves V4 and V5 are shut, and valves V1, V2, and V6 are opened. A sample of the substantially pure $O_2$ gas (which comprises a minor amount of argon as contamination and a major amount of oxygen so that the gas has a high oxygen to argon volume ratio) is fed from container C by way of first conduit 220 to pressure swing adsorption apparatus 200, which, as noted above, is adapted for selectively removing oxygen from air.

Once inside of pressure swing adsorption apparatus 200, the gas sample is subjected to pressure swing adsorption using towers 210A, 210B in order to remove a portion of the oxygen from the gas sample and provide a modified gas sample having a smaller oxygen to argon volume ratio than the original gas sample had. By way of third conduit 400, the modified gas sample leaves pressure swing apparatus 200 and is fed to gas chromatography apparatus 300.

As noted above, gas chromatography apparatus 300 is adapted to generate gas chromatography graphs from samples fed into it. Gas chromatography apparatus 300 now generates, from the modified gas sample, a gas chromatography graph.

Although, as noted above, oxygen and argon have similar retention times in a gas chromatography apparatus (because they have very similar physical properties), since a portion of the oxygen has been removed from the original sample of gas, the modified gas sample has a lower oxygen to argon volume ratio than the original gas sample had. As a result, the graph has a large peak from the oxygen in the modified gas sample and a small peak from the argon in the modified gas sample, with the small argon peak preceding and being resolved from the large oxygen peak.

The gas chromatography graph obtained from the modified gas sample is now compared to another gas chromatography graph, which may have been obtained previously to obtaining the graph from the modified gas sample or may be obtained after obtaining the graph from the modified gas sample.

More particularly, the other gas chromatography graph is obtained directly from another sample of the substantially pure $O_2$ gas from container C, free of first subjecting the other gas sample to pressure swing adsorption. In other words, valves V1, V6 are shut, and valve V4 is opened. Then, the other sample of the gas from container C is fed by way of second conduit 320 directly to gas chromatography apparatus 300 in order to generate by gas chromatography apparatus 300 another gas chromatography graph from the other gas sample.

Since, as noted above, oxygen and argon have very similar physical properties, they have similar retention times in a gas chromatography apparatus, and since the other sample of gas has such a high oxygen to argon volume ratio (i.e., the same as that of the substantially pure $O_2$ gas in container C), the other gas chromatography graph will have a large unitary peak that is predominantly from the oxygen in the other gas sample and that masks a small peak from the argon in the other gas sample.

Finally, the gas chromatography graph obtained from the modified gas sample is compared with the gas chromatography graph obtained from the other gas sample, and from the comparison, a more accurate determination can be made of the amount of argon contamination in the substantially pure $O_2$ gas than can be made from subjecting a sample of the substantially pure $O_2$ gas to a gas chromatography process that is free of being preceded by a pressure swing adsorption process.

As noted above, usually high purity oxygen has a small amount of nitrogen contamination, as well as a small amount of argon contamination. If such is the case, both the gas chromatography graph obtained from the modified gas sample and the gas chromatography graph obtained from the other gas sample will have a small resolved nitrogen peak following the large oxygen peak.

If both graphs have such a nitrogen peak, it is preferred to employ the nitrogen peaks for the comparison of both graphs when calculating the amount of argon contamination. In other words, each the nitrogen peak can be quantified by comparison against a gas chromatography graph obtained from the reference gases in reference tank 340, which is used as a calibration gas standard. These quantified nitrogen peaks are then used as an internal standard to quantify the resolved argon peak in the graph from the modified gas sample as further described in the Examples below.

EXAMPLES

The following tests were performed on samples of substantially pure $O_2$ gas with a combination pressure swing apparatus/gas chromatography apparatus in accordance with the invention, as well as the following comparison tests performed on samples of substantially pure $O_2$ gas solely with a gas chromatography apparatus.

The following apparatus were employed for performing tests and comparison tests.

The particular gas chromatography apparatus employed was Item Serial No. P200 portable gas chromatography apparatus, commercially available from MTI Analytical Instruments. Inside of the MTI gas chromatography apparatus was a molecular sieve column and a pipe (provided with a valve, which was left opened during the tests) connected the MTI gas chromatography apparatus to a reference tank of research grade helium (minimum assayed purity of 99.9999% or better of He, with 10 PPMV of $N_2$) used as the reference gas.

The particular pressure swing apparatus employed was Item Serial No. 76-92-0001, commercially available from Whatman. Employing timed solenoid valves, the oxygen is de-sorbed from the zeolite molecular sieves in the towers by well-known blow down procedures and venting of the oxygen to the air. The Whatman apparatus included a tank of helium for use as a helium purge. The towers of the Whatman apparatus were connected to the tank with a pipe that included a valve that was left shut, as the purge was not used during the tests. Also, the Whatman apparatus included a filter associated with a first conduit connected to the towers. The filter was a Boston Grade GS membrane filter that removes particulates that may be present in the air being fed to the Whatman apparatus down to 0.01 micron (absolute). The filter was not necessary and not used in the tests. Additionally, the towers of the Whatman apparatus were connected by way of the first conduit (which was provided with first and second valves) to a container of gas, and the MTI gas chromatography apparatus was also connected to the same container of gas by way of a second conduit (which was provided with a valve). Furthermore, the Whatman apparatus and the MTI gas chromatography apparatus were connected to each other with a third conduit (which was provided with a valve).

The container of gas was purchased from National Welders Supply Company, Inc., of Charlotte, N.C. The gas was substantially pure $O_2$ that comprised a minor contaminant amount of argon and a major amount of oxygen, and was marketed by National Welders Supply Company as having a high oxygen to argon volume ratio whereby the amount argon contamination was represented to be about 4 PPMV or less. The gas also contained minor amounts of various other contaminant gases, such as nitrogen, represented to be about 2 PPMV or less by National Welders Supply Company.

For the comparison testing, the valves in the first conduit and the valve in the third conduit were shut, and the valve in the second conduit was opened. Then, a sample of the substantially pure oxygen gas from the container was fed by way of the second conduit directly to the gas chromatography apparatus, without first passing the sample through the towers of the pressure swing adsorption apparatus. The conditions of gas chromatography apparatus were a sample time of 10 minutes, a column head pressure of 15.6 pounds per square inch gauge (2.13 kg per square centimeter), a column temperature of 34° C., an inject time of 255 milliseconds, and a run time of 160 seconds.

Figure 2A:
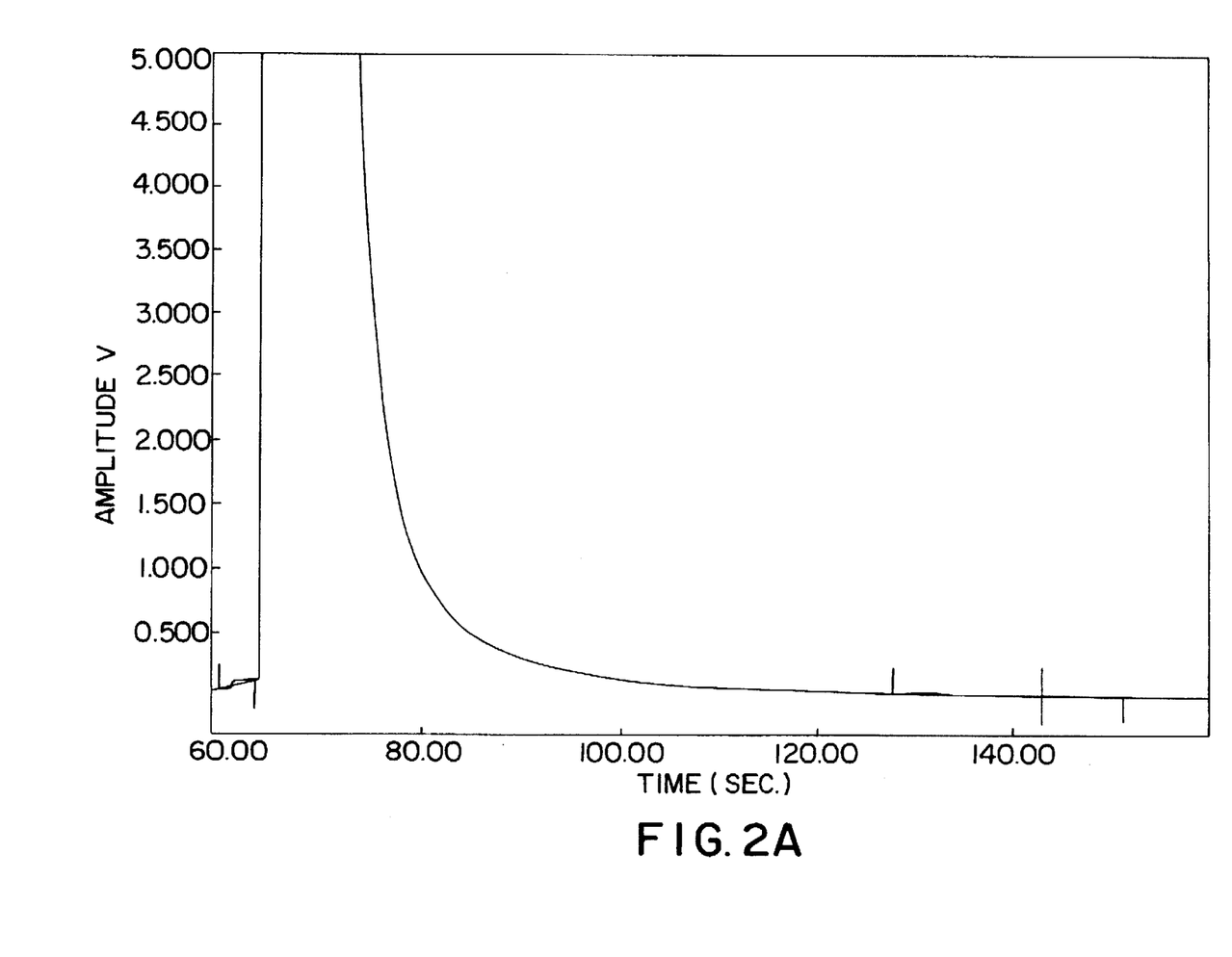
FIG. 2A is a graph generated from an oxygen sample by the gas chromatography apparatus shown in FIG. 1, and illustrates a large unitary peak at about 65 to 75 seconds that is predominantly from the oxygen in the sample and that is masking a small peak from the argon in the sample.
Figure 2B:
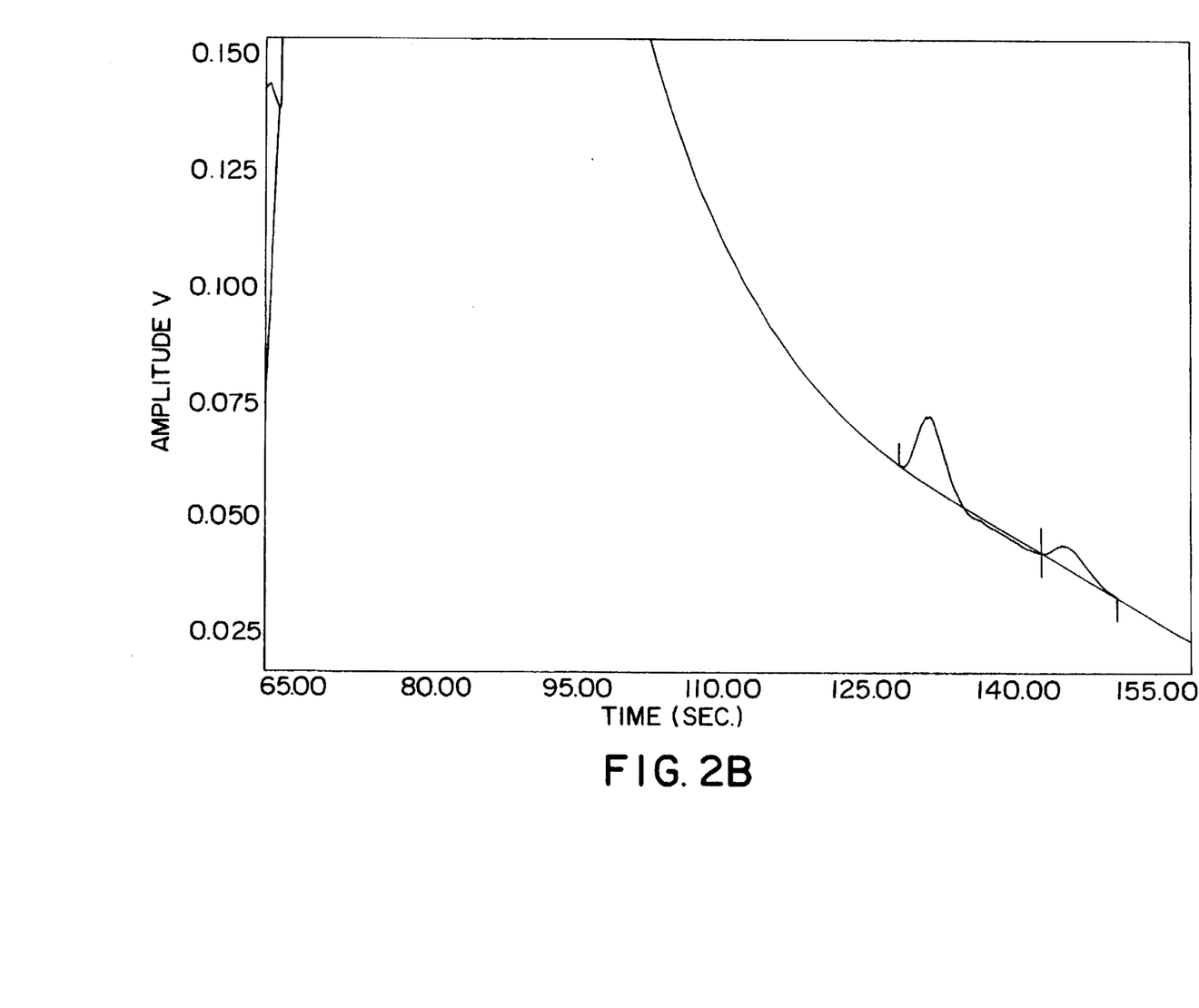
FIG. 2B is an enlargement of the graph shown in FIG. 2A in order to illustrate better the small nitrogen peak appearing at about 128 seconds and the small krypton peak appearing at about 143 seconds.

FIG. 2A (and FIG. 2B, which is an expansion of FIG. 2A) is a comparison graph generated from this oxygen sample by the gas chromatography apparatus, and illustrates a large unitary peak at about 65 to 75 seconds that is predominantly from the oxygen in the sample and that is masking a small peak (which cannot be seen) from the argon in the sample. The small peak toward the right of the graph at about 128 seconds is from nitrogen contamination in the sample. The even smaller peak on the far right of the graph at about 143 seconds (better seen on the expanded graph of FIG. 2) is from krypton contamination in the sample. The calculations for the area under the peaks are set out in the following Table.

Table of Calculations for Area under the Peaks for $O_2$
Sample Fed Directly to Gas Chromatography Apparatus

| Peak No. | Start Time | Retention Time | Stop Time | Area | Area % |
|---|---|---|---|---|---|
| 1 | 0.22 | 0.27 | 0.33 | 100072 | 0.35 |
| 2 | 0.33 | 0.53 | 0.86 | 1228898 | 4.35 |
| 3 | 36.25 | 47.63 | 48.75 | 7640600 | 27.05 |
| 4 | 48.75 | 52.67 | 53.39 | 4418532 | 15.64 |
| 5 | 53.39 | 55.31 | 58.91 | 4194624 | 14.85 |
| 6 | 58.91 | 61.07 | 62.51 | 4896816 | 17.34 |
| 7 | 127.71 | 130.59 | 142.75 | 3784928 | 13.40 |
| 8 | 142.75 | 144.99 | 151.07 | 1981108 | 7.01 |

For testing with the combination pressure swing adsorption/gas chromatography apparatus, the respective valves in the first and third conduits were opened and the valve in the second conduit shut. Then, a sample of the substantially pure oxygen gas from the container was fed first by way of the first conduit through the towers of the pressure swing adsorption apparatus, where the sample was subjected to pressure swing adsorption and hence modified by the towers having removed a portion of the oxygen from the sample. As a result, the modified gas sample had a smaller oxygen to argon volume ratio.

The modified sample was next fed by way of the third conduit to the gas chromatography apparatus. The conditions of gas chromatography apparatus were a sample time of 10 minutes, a column head pressure of 15.3 pounds per square inch gauge (2.11 kg per square centimeter), a column temperature of 35° C., an inject time of 255 milliseconds, and a run time of 160 seconds.

Figure 3:
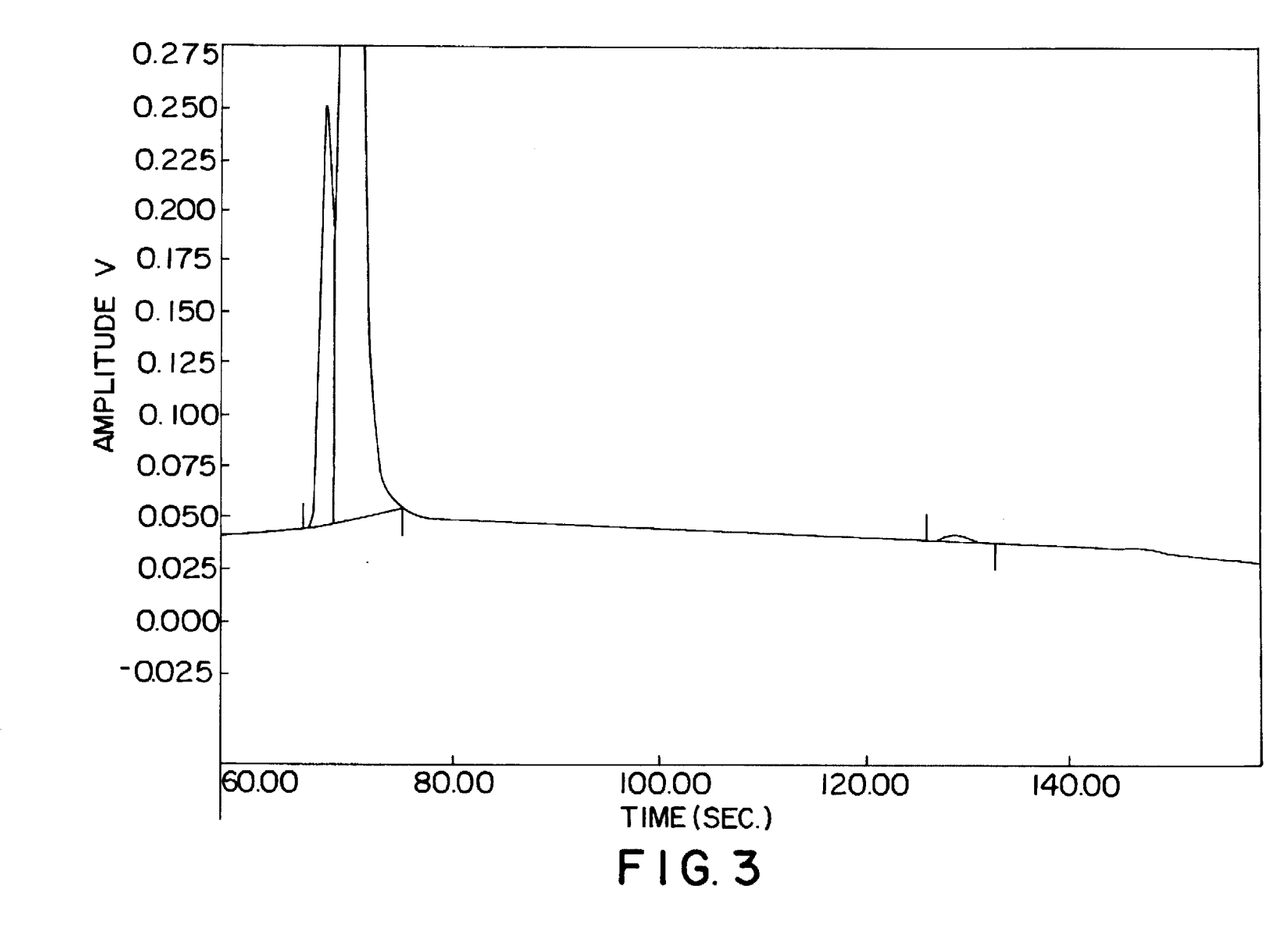
FIG. 3 is a graph generated from an oxygen sample modified by the combination pressure swing apparatus and gas chromatography apparatus shown in FIG. 1, and illustrates a large peak at about 65 to 75 seconds from the oxygen in the modified sample and a small peak at about 65 seconds from the argon in the modified sample, with the argon peak preceding and being resolved from the oxygen peak.

FIG. 3 is a graph generated from the modified gas sample obtained from passing through the combination pressure swing apparatus and gas chromatograph apparatus, and illustrates a large peak at about 65 to 75 seconds from the oxygen in the modified gas sample and a small peak at about 65 seconds from the argon in the modified gas sample, with the argon peak preceding and being resolved from the oxygen peak. The small peak toward the right of the graph at about 128 seconds is from nitrogen contamination in the sample. On the far right of the graph at about 143 seconds is an even smaller peak (which cannot be seen because the graph of FIG. 3 is not sufficiently expanded to show this peak) from krypton contamination in the sample.

The calculations for the area under the peaks are set out in the following Table.

Table of Calculations for Area under the Peaks for $O_2$
Sample Fed First to Pressure Swing Apparatus and then to Gas Chromatography Apparatus

| Peak No. | Start Time | Retention Time | Stop Time | Area | Area % |
|---|---|---|---|---|---|
| 1 | 0.23 | 0.27 | 0.32 | 92485 | 0.04 |
| 2 | 0.32 | 0.52 | 1.05 | 3653976 | 1.57 |
| 3 | 65.23 | 67.39 | 68.03 | 25057018 | 10.78 |
| 4 | 68.03 | 69.55 | 74.75 | 202733424 | 87.25 |
| 5 | 126.335 | 129.23 | 133.07 | 813622 | 0.35 |

The amount of argon contamination in the substantially pure oxygen sample was determined by the following equation.

$$C_{Ar} = (C_{N2} \times RRF_{N2} \times A_{Ar\,peak})/(A_{N2\,peak})$$

where:

$C_{Ar}$ is the concentration of the argon gas in the sample, $C_{N2}$ is the concentration of the nitrogen gas in the sample (where the nitrogen peaks from the 2 graphs were quantified by comparison against a gas chromatography graph obtained from the He and $N_2$ reference gases in the reference tank), $RRF_{N2}$ is the relative response factor for nitrogen versus argon based on the difference in the respective thermal conductivity coefficients* against a helium carrier gas,

*The respective thermal conductivity coefficients for argon and nitrogen were obtained from *Gas Analysis Instrumentation*, by Anthony Verdin, published in 1973.

$A_{Ar\,peak}$ is the area under the argon peak in the graph from the modified gas sample, and $A_{N2\,peak}$ is the area under the nitrogen peak in the graph from the modified gas sample.

Thus, inserting into the equation the data from the 2 graphs as follows:

$$C_{Ar} = (1.3\ PPMV \times 0.683 \times 25057018)/(813622) = 27.3\ PPMV$$

where:

$C_{N2} = (A_{N2\,peak}) \times (C_{N2\,standard}/A_{N2\,standard}) = (813622) \times (6.19\ PPMV/3784928) = 1.3\ PPMV$ $RRF_{N2} = 0.683$ $A_{Ar\,peak} = 25057018$ and $A_{N2\,peak} = 813622$ Thus, the argon contamination was determined to be 27.3 PPMV, although, as noted above, National Welders Supply Company represented that the high purity oxygen had an amount of argon contamination of about 4 PPMV or less.

It will be understood that various details of the invention may be changed without departing from the scope of the invention. Furthermore, the above description is for the purpose of illustration only, and not for the purpose of limitation—the invention being defined by the claims.

What is claimed is:

1. A process for determining how much argon contamination is present in a gas comprising a minor amount of argon as contamination and a major amount of oxygen so that the gas has a high oxygen to argon volume ratio, the process comprising the steps of:

(A) feeding a sample of the gas from a container of the gas to a pressure swing adsorption apparatus adapted for selectively removing oxygen from air;

(B) subjecting the gas sample to pressure swing adsorption therein to remove a portion of the oxygen from the gas sample and provide a modified gas sample having a smaller oxygen to argon volume ratio than the gas sample originally had;

(C) subsequently feeding the modified gas sample, after the modified gas sample leaves the pressure swing adsorption apparatus, to a gas chromatography apparatus being adapted to generate gas chromatography graphs and including a column run at a temperature of at least about 70° F. (21.1° C.), in order to generate from the modified gas sample, a gas chromatography graph having a large peak from the oxygen in the modified gas sample and a small peak from the argon in the modified gas sample with the small argon peak preceding and being resolved from the large oxygen peak;

(D) comparing the gas chromatography graph obtained from the modified gas sample to another gas chromatography graph obtained by subjecting another sample of the gas from the container directly to the gas chromatography apparatus with the column run at a temperature of at least about 70° F. (21.1° C.), free of first subjecting the other gas sample to pressure swing adsorption, and the other gas chromatography graph having a large unitary peak being predominantly from the oxygen in the other gas sample and masking a small peak from the argon in the other gas sample; and (E) obtaining from comparing a more accurate determination of the amount of argon contamination in the gas than can be obtained from subjecting a sample of the gas to a gas chromatography process free of being preceded by a pressure swing adsorption process.

2. The process of claim 1, with the gas in the container having said high oxygen to argon volume ratio, with the amount of argon contamination in the oxygen being about 30 parts per million volume or less.

3. The process of claim 2, with the gas in the container having said high oxygen to argon volume ratio, with the amount of argon contamination in the oxygen being about 5 parts per million volume or less.

4. The process of claim 1, wherein the pressure swing adsorption apparatus includes at least one tower that contains an adsorbent material that is selective toward removing oxygen.

5. The process of claim 1, wherein the column of the gas chromatography apparatus is a molecular sieve column, and the gas chromatography apparatus employs helium as a reference gas.

6. The process of claim 1, wherein the gas chromatography apparatus is run with the column at a temperature of about 70° F. to about 122° F. (about 21.1° C. to about 50° C.) during the process.

7. The process of claim 6, wherein the gas chromatography apparatus is run with the column at a temperature of about 95° F. to about 104° F. (about 35° C. to about 40° C.).

8. The process of claim 1, wherein the gas further includes a minor amount of nitrogen as contamination, and the modified gas further includes a minor amount of nitrogen as contamination, and in step (C), the gas chromatography apparatus employs a major amount of helium and a minor amount of nitrogen as reference gases, the modified gas sample further includes nitrogen and the gas chromatography graph further includes a small peak from the nitrogen with the small nitrogen peak following and being resolved from the large oxygen peak; and in step (D), the gas chromatography apparatus employs a major amount of helium and a minor amount of nitrogen as reference gases, the other gas chromatography graph further includes a small peak from the nitrogen with the small nitrogen peak following and being resolved from the large oxygen peak.

9. In combination, a pressure swing adsorption apparatus and a gas chromatography apparatus and a conduit connecting the pressure swing adsorption apparatus and the gas chromatography apparatus, the combination being an apparatus for determining how much argon contamination is present in substantially pure oxygen, the combination comprising:

(A) a pressure swing adsorption apparatus adapted for selectively removing oxygen from air and being connected to a conduit for receiving a sample of gas from a container of the gas, and wherein the gas comprises a minor amount of argon as contamination and a major amount of oxygen so that the gas has a high oxygen to argon volume ratio, in order to subject the gas sample to pressure swing adsorption inside the pressure swing adsorption apparatus and remove a portion of the oxygen from the gas sample and provide a modified gas sample having a smaller oxygen to argon volume ratio than the gas sample originally had;

(B) a gas chromatography apparatus having a column and being adapted to generate gas chromatography graphs of gas samples and being connected to a conduit for receiving another sample of the gas directly from the container; and (C) a conduit connecting the pressure swing adsorption apparatus and the gas chromatography apparatus and adapted to transfer the modified gas sample to the gas chromatography apparatus after the modified gas sample leaves the pressure swing adsorption apparatus, which gas chromatography apparatus will, when the column is at a temperature of at least about 70° F. (21.1° C.), (a) generate from the other gas sample, a gas chromatography graph having a large unitary peak (i) being predominantly from the oxygen in the other gas sample and (ii) masking a peak from the argon in the other gas sample, and (b) generate from the modified gas sample, a gas chromatography graph having a large peak from the oxygen in the modified gas sample and a small peak from the argon in the modified gas sample with the argon peak preceding and being resolved from the oxygen peak, whereby the two graphs can be compared to obtain, from the combination apparatus, a more accurate determination of the amount of argon contamination in the gas than can be obtained from a gas chromatography apparatus that tests the gas sample free of the gas sample first being modified through a pressure swing adsorption apparatus.

10. The combination apparatus of claim 9, with the gas in the container having said high oxygen to argon volume ratio, with the amount of argon contamination in the oxygen being about 30 parts per million volume or less.

11. The combination apparatus of claim 10, with the gas in the container having said high oxygen to argon volume ratio, with the amount of argon contamination in the oxygen being about 5 parts per million volume or less.

12. The combination apparatus of claim 9, wherein the pressure swing adsorption apparatus includes at least one tower that contains an adsorbent material that is selective toward removing oxygen.

13. The combination apparatus of claim 9, wherein the column of the gas chromatography apparatus is a molecular sieve column free of cooling means so that the gas chromatography apparatus can run with the column only at a temperature of at least about 70° F. (21.1° C.), and the gas chromatography apparatus employs helium as a reference gas.

14. The combination apparatus of claim 9, wherein the gas further includes a minor amount of nitrogen as contamination, the modified gas sample further includes a minor amount of nitrogen as contamination, and the gas chromatography apparatus employs a major amount of helium and a minor amount of nitrogen as reference gases, whereby the gas chromatography apparatus will (a) generate from the other gas sample a gas chromatography graph further including a small peak from the nitrogen with the small nitrogen peak following and being resolved from the large oxygen peak, and (b) generate from the modified gas sample, a gas chromatography graph further including a small peak from the nitrogen with the small nitrogen peak following and being resolved from the large oxygen peak.

* * * * *